United States Patent
Fung et al.

(10) Patent No.: US 7,930,196 B2
(45) Date of Patent: Apr. 19, 2011

(54) MODEL-BASED AND DATA-DRIVEN ANALYTIC SUPPORT FOR STRATEGY DEVELOPMENT

(75) Inventors: Robert M. Fung, Davis, CA (US); Stuart Crawford, Piedmont, CA (US)

(73) Assignee: Fair Isaac Corporation, Minneapolis, MN (US)

(*) Notice: Subject to any disclaimer, the term of this patent is extended or adjusted under 35 U.S.C. 154(b) by 1776 days.

(21) Appl. No.: 10/474,219

(22) PCT Filed: Apr. 10, 2002

(86) PCT No.: PCT/US02/11537
§ 371 (c)(1), (2), (4) Date: Apr. 27, 2004

(87) PCT Pub. No.: WO02/084925
PCT Pub. Date: Oct. 24, 2002

(65) Prior Publication Data
US 2004/0181441 A1    Sep. 16, 2004

Related U.S. Application Data

(60) Provisional application No. 60/283,126, filed on Apr. 11, 2001.

(51) Int. Cl.
G06F 9/44 (2006.01)
G06F 17/50 (2006.01)
(52) U.S. Cl. ............. 705/7
(58) Field of Classification Search ............. 705/7
See application file for complete search history.

(56) References Cited

U.S. PATENT DOCUMENTS

| | | | | |
|---|---|---|---|---|
| 6,708,155 | B1* | 3/2004 | Honarvar et al. | 705/7 |
| 7,058,588 | B2* | 6/2006 | Young et al. | 705/8 |
| 2001/0027455 | A1* | 10/2001 | Abulleil et al. | 707/102 |
| 2005/0197875 | A1* | 9/2005 | Kauffman | 705/7 |

OTHER PUBLICATIONS

Mason, Rachel; Towill, Denis R; Using the information decoupling point to improve supply chain performance, International Journal of Logistics Management, v10n2 pp. 13-26, 1999. DIALOG File 15.*

* cited by examiner

*Primary Examiner* — Andre Boyce
(74) *Attorney, Agent, or Firm* — Mintz, Levin, Cohn, Ferris, Glovsky and Popeo, P.C.

(57) ABSTRACT

The invention provides an overall architecture for optimal strategy design using both historical data and human expertise. The presently preferred architecture supports the tasks of strategy design and strategy analysis, and provides extensions to influence diagrams, translation of an influence diagram as a nonlinear optimization problem, and use of induction after optimization to derive decision rules.

32 Claims, 5 Drawing Sheets

MODEL-BASED AND DATA-DRIVEN ANALYTIC SUPPORT FOR STRATEGY DEVELOPMENT

CROSS REFERENCE TO RELATED APPLICATION

This application is a national stage application of International Patent Application No. PCT/US02/11537, filed Apr. 10, 2002, and entitled "MODEL-BASED AND DATA-DRIVEN ANALYTIC SUPPORT FOR STRATEGY DEVELOPMENT", which in turn claims priority to Application No. 60/283,126, filed Apr 11, 2001. Each of the foregoing disclosures are incorporated by reference herein in their entirety.

TECHNICAL FIELD

The invention relates to strategy optimization. More particularly, the invention relates to model-based and data-driven analytic support for strategy development.

DESCRIPTION OF THE PRIOR ART

The prior art relevant to this invention is in the field of decision analysis.

Decision analysis is the quantitative study of a decision situation to gain insight and to recommend at least one action. In decision analysis, a mathematical model (a decision model) of the decision situation is developed using probability theory and utility theory. An influence diagram is one way to represent a decision model.

The following sections describe the italicized terms above.
Decision Situation

A decision situation is a process in which an individual or organization must make a decision, or commit to at least one action. It may involve a single decision, such as a person's choice of which car to buy. Alternatively, it may involve similar decisions applied to all individuals in a population, such as a bank's choice of which credit card customers to offer a higher credit limit.

A common thread to almost every decision is that there is uncertainty about the future outcomes resulting from the decision. In the car buyer example, there is uncertainty whether a particular model of car performs well over time; in the credit limit example, there is uncertainty about whether a particular account uses the extra credit or goes bankrupt, among other possible outcomes.

Almost every decision must be made under uncertainty, on the basis of predictions or estimates of future outcomes. There is a distinction between the actual results and the expected results predicted by the model. The decision is made based on the predicted results.
Decision Model A decision model is a mathematical description of a decision situation. In developing a decision model, an analyst must describe the relevant parameters of the situation clearly enough to quantify them. In particular, the uncertain outcomes must be clearly specified and their uncertainties quantified by probability distributions.

In decision situations involving multiple cases, such as the credit limit example, one uncertainty that must be quantified is the makeup and character of the target population over which the decision is expected to be applied. In many cases, for instance in a credit card application situation, the target population is unknown at the time the decision model is made.

A decision model consists of a set of variables and the relationships between them. The set of variables includes decision variables, value variables, decision key variables, and other uncertain variables.

The decision variables represent at least one action to select in each case. Often, a decision is modeled as a categorical, discrete, or nominal variable that can take on any value from a finite set of feasible actions. There may be multiple decision variables in a decision model.

The value variables represent the quantity that must be optimized in the optimization. If there are multiple value variables in a decision model, the objective function of the optimization is the sum of the values of all value variables.

The decision key variables represent quantities that are known or observed at the time the decision is to be made.

The other uncertain variables are all variables that are not decision, value, or decision key variables.
Influence Diagram An influence diagram graphically represents a decision model, with nodes or shapes representing variables in the model, and arcs or arrows between nodes representing relationships between variables. Models are built and edited graphically by the user within a graphical user interface.

An influence diagram is composed of graphical elements of the following four types:

Decision node, which is a square node representing a decision variable.

Value node, which is a hexagonal or octagonal node representing a value variable.

State node, which is a circular or elliptical node representing any other variable Arc, which is a directed arrow between two nodes representing a relationship between the two corresponding variables Influence diagrams comprise a technology that has been known in the art since the 1960's. It would be desirable to provide improvements to the field of strategy optimization that extend the influence diagram.

SUMMARY OF THE INVENTION

The invention provides an overall architecture for optimal strategy design using both historical data and human expertise. The presently preferred architecture supports the tasks of strategy design and strategy analysis, and provides extensions to Influence diagrams, translation of an influence diagram as a nonlinear optimization problem, and induction of decision rules from the optimization result.

DETAILED DESCRIPTION OF THE INVENTION

Figure 1:
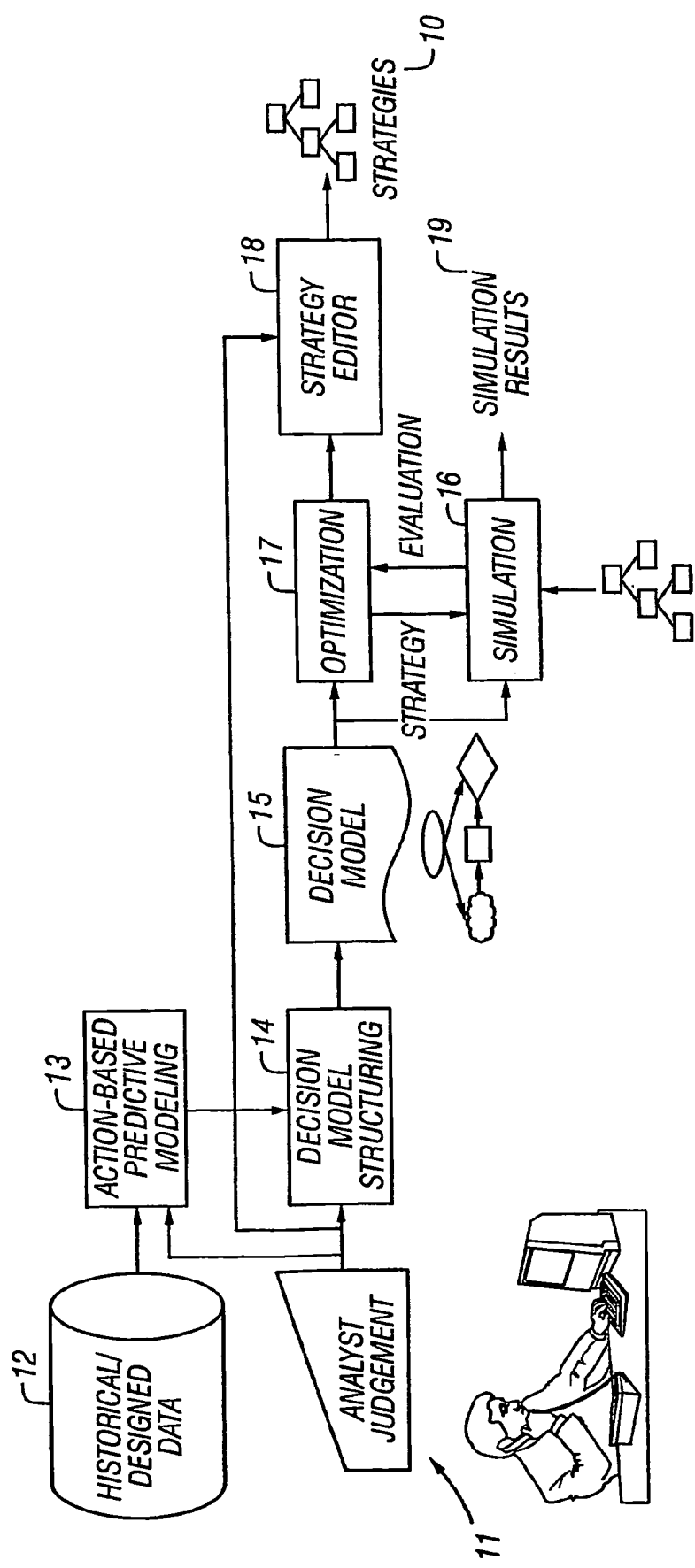
FIG. 1 is a block schematic diagram showing data-driven and model-based strategy optimization according to the invention.

The invention provides an overall architecture for optimal strategy design using both historical data and human expertise. The presently preferred architecture supports the tasks of strategy design and strategy analysis, and provides extensions to influence diagrams, translation of an influence diagram as a nonlinear optimization problem, and induction of decision rules from the optimization results.

Extensions to Influence Diagrams

Strategy optimization provides the following unique extensions to influence diagram methodology:

Constrained optimization. The ability to place constraints on an optimization in an influence diagram.

Dataset-based optimization. The ability to optimize over an explicitly specified set of cases (the representative population), as well as over a set of cases implicitly specified by the joint prior distributions of the decision keys.

Mapping the decision model to a dataset file. The ability to map the variables in an influence diagram to the columns of a dataset.

The Translation of an Influence Diagram as a Nonlinear Optimization Problem

Strategy optimization translates an influence diagram as a nonlinear optimization problem. This allows the influence diagram to contain continuous variables with complex functional forms, the specification of high-dimensional representative populations, and constraints.

The Induction of Decision Rules from the Optimization Results

After the nonlinear optimization has obtained an optimization solution over the cases in the representative population, it uses induction techniques to derive decision rules that are applicable to the target population. The induction techniques used create strategies that are understandable, editable, and implementable in existing decision engine software systems.

Methodology Overview

The methodology for using strategy optimization comprises the following steps:

56. Modeling a decision situation. A strategy optimization influence diagram and a representative population are created to model the decision situation mathematically. The strategy optimization influence diagram is formatted as a nonlinear optimization problem over a representative population.
57. Formulating a strategy optimization decision model as a nonlinear optimization problem. Nonlinear optimization techniques are used to assign at least one action to each case in the representative population. A strategy table is created containing all cases in the representative population, along with the assigned action for each case.
58. Developing a strategy using induction techniques on the results of an optimization. Induction techniques are applied to the strategy table to derive a set of decision rules, i.e. a strategy, from the data. The set of rules induced can then be operationalized through a decision engine, such as those manufactured by Fair, Isaac Company of San Rafael, Calif. (Fair Isaac). Fair Isaac has several decision engine products, including the TRIAD, Decision System, and StrategyWare decision engine products.

The above steps are described in the following discussion.

Modeling a Decision Situation

The Strategy Optimizer formulates and specifies a decision situation as a decision model, using a modeling language based on the technology of influence diagrams. The following discussion describes the strategy optimization modeling language, including extensions to existing technologies that are unique to strategy optimization.

Constrained optimization. In Strategy Optimizer, the user can associate a set of constraints with the model. This is important because real-world decision situations almost always include significant constraints on the actions of the decision maker. Constraints require trade-offs between the results of acting in individual cases. Without constraints, optimal solution for each case is considered independently of the solution for all other cases. Other influence diagram optimize the decision in an unconstrained way, limiting their application to decision situations without significant constraints.

Dataset-based optimization. In strategy optimization, the user can optimize over an explicitly specified set of cases, called the representative population. Other Bayesian network techniques optimize only over a set of cases implicitly specified by the joint prior distributions of the decision keys (strategy optimization can be applied in this way). The advantage of this extra functionality is that strategy optimization can be applied to situations where joint prior probabilities do not exist or are problematic to define.

Mapping the decision model to a dataset file. This feature is essential to the dataset-based optimization described above. The user can map (or relate) each decision key in the decision model with a column in a dataset. No other Bayesian network techniques we know of boasts this feature.

Formulating a Strategy Optimization Decision Model as a Nonlinear Optimization Problem One objective of the invention is to formulate a nonlinear optimization problem that corresponds exactly to a decision model specified in the modeling language of strategy optimizer. Once expressed this way, the optimal solution to the decision model can be determined by using integer programming.

Formal Notation for a Decision Model

The following discussion provides a formal notation for a decision model.

The following notational conventions are followed:

Subscripts are indicated by an underscore, e.g. $A\_i$ means "A subscript i"

Subscript i is used for cases and quantities corresponding to cases

Subscript j is used for constraints and quantities corresponding to constraints

A sum is indicated by the notation, "Sum_(c in C) {f(c)}", which means "the sum of the quantities computed by applying function f to each of the cases c in C"

Sets are indicated by upper-case letters

The number of elements in a set is indicated by capital N subscripted by the name of that set A decision model consists of the following elements:

A "decision variable" D with set A of possible alternative actions $a\_1, a\_2, \ldots, a\_N\_A$ ($N\_A >= 1$)

A set E of "decision key variables" $E\_1, E\_2, \ldots, E\_N\_E$ that are known or observed at the time the decision is to be made for each case. ($N\_E >= 0$)

A set V of "value variables" $V\_1, V\_2, \ldots, V\_N\_V$. ($N\_V >= 1$)

A set U of "portfolio input variables" $U\_1, U\_2, \ldots, U\_N\_U$ ($N\_U >= 0$). The joint state space of U, or the set of all possible instantiations of portfolio variables, is called M. There is a joint distribution $P(mU=Mm)$ defined over all m in M.

A set K of "case-level constraints" $K\_1, K\_2, \ldots, K\_N\_K$ ($N\_K>=0$) in one of two different forms:

"If $q\_j(E)$, then x in $S\_j$", where $q\_$ is a logical predicate that is either true or false and that is a function of the decision key variables, and $S\_j$ is a subset of A "$h\_j(E, x)<d\_j$", where $h\_j$ is a function that evaluates to a real number and is a function of the decision and the decision key variables, and $d\_j$ is a constant A "representative population" or "portfolio" C of cases $c\_1 \ldots c\_N\_C$ ($N\_C>=1$). There is a set of sample weights W ($w\_1, w\_2, \ldots, w\_N\_C$), with each element $w\_i$ corresponding to case $c\_i$. Because of this one-to-one correspondence, each element $w\_i$ can also be notated $w(c\_i)$.

A "dataset mapping" between the representative population and the decision model such that each case represents an instantiation of the decision key variables $E\_1, E\_2, \ldots, E\_N\_E$ A set X of variables $x\_1, x\_2, \ldots, x\_N\_C$. Each variable $x\_i$ represents at least one action to assign to the case $c\_i$. Due to this one-to-one correspondence, the variable $x\_i$ is sometimes notated $x(c\_i)$.

A set T of "portfolio-level constraints" $T\_1, T\_2, \ldots, T\_N\_T$ ($N\_T>=0$) of the form "$G\_j(C,X,W)<=b\_j$", where $b\_j$ is a constant and the functional forms for $G\_j(C,X,W)$ include, but are not limited to:

The sum of some function $g(c, x(c))$ over all cases in C, or $Sum\_(c\ in\ C)\ \{w(c)*g(c, x(c))\}$ The mean of some function $g(c, x(c))$ over all cases in C, or the ratio of $Sum\_(c\ in\ C)\ \{w(c)*g(c, x(c))\}$ to $Sum\_(c\ in\ C)\ \{w(c)\}$ The mean or sum of some function $g(c, x(c))$ over a subset of cases in C The sum of some function $g2(c, x(c), m)$ over all cases in C for all possible instantiations m of the portfolio variables in U, or $Sum\_(c\ in\ C,\ m\ in\ M)\ \{P(U=m)*w(c)*g2(c, x(c), m)\}$ Input to the Procedure The input to the procedure is a decision model, as described above.

Formulation Procedure

There are three steps in formulating the given decision model as a nonlinear optimization problem:

Step 1: Specify the cases in the representative population

Step 2: Construct the feasible actions for the decision for each case

Step 3: Specify the objective function of the optimization

These steps are described in the following discussion:

Step 1: Specify the Cases in the Representative Population

The procedure is: Select one of the methods for specifying a set of cases.

There are a number of ways to specify the cases in the representative population, including but not limited to those listed here:

Use a set of cases from a previously encountered decision situation

Create, design, or specify a set cases manually

Draw N_C samples from the joint distribution of decision key variables in the decision model using Monte Carlo methods. This requires a joint probability distribution be defined over the decision key variables.

Enumerate all possible cases. This requires that the set of possible combinations of the values of the decision keys be finite.

Step 2: Construct the Feasible Actions for the Decision for Each Case

The set of feasible actions for each case is notated $A\_i$ and is a function of the case-level constraints.

The procedure is: For each case $c\_i$

Instantiate the decision keys E according to that case

For each case-level constraint $K\_j$, compute the set $A\_ij$ of feasible decisions.

For constraints of type "If $q\_j(E)$, then x in $S\_j$", compute the logical predicate $q\_j(E)$. If it is true, then set $A\_ij$ to $S\_j$. If it is false, then set $A\_ij$ to A (all possible actions are feasible)

For constraints of type "$h\_j(E, x)<d\_j$", set $A\_ij$ to the empty set. For each alternative action a in A, compute the value of $h\_j(E, a)$. If $h\_j(E, a)<d\_j$, then add a to $A\_ij$ Set $A\_i$ to be the set of all actions in A that are feasible for all constraints (that is, $A\_i$ is the intersection of the sets $A\_ij$)

Step 3: Specify the Objective Function of the Optimization

The procedure is: Select one of the functional forms for the objective function $F(C,X,W)$.

The functional forms for $F(C,X,W)$ include, but are not limited to those listed here.

The sum of some function $f(c, x(c))$ over all cases in C, or $Sum\_(c\ in\ C)\ \{w(c)*f(c, x(c))\}$ The mean of some function $f(c, x(c))$ over all cases in C, or the ratio of $Sum\_(c\ in\ C)\ \{w(c)*f(c, x(c))\}$ to $Sum\_(c\ in\ C)\ \{w(c)\}$ The mean or sum of some function $f(c, x(c))$ over a subset of cases in C The sum of some function $f2(c, x(c), m)$ over all cases in C for all possible instantiations m of the portfolio variables in U, or $Sum\_(c\ in\ C,\ m\ in\ M)\ \{P(U=m)*w(c)*f(c, x(c), m)\}$ Often, the component function $f(c, x(c))$ is the sum of the value of the value variables, evaluated at each case. This is computed for each case c by setting the decision keys in the decision model according to c, then setting the decision according to $x(c)$, then evaluating all variables in the network, then evaluating the sum $V\_1+V\_2+ \ldots +V\_N\_V$.

Result of the Procedure

The result of this process is a nonlinear optimization problem stated as:

Select values for all variables $x\_i$ in X to maximize $F(C, X, W)$

Subject to the constraints:

$x\_i$ is in $A\_i$ (for all i in 1 to N_C)

$G\_j(C,X,W)<=b\_j$ (for all j in 1 to N_T)

Once formulated as a nonlinear optimization problem, the decision model can be optimized by using integer programming, as is known to those skilled in the art.

The output of the optimization procedure is a strategy table, i.e. a flat-file dataset with a row for each case $c\_i$ in the representative population C, one column for each decision key of case $c\_i$, and a column for the optimal action $x^*\_i$ assigned to case $c\_i$.

Developing a Strategy Using Induction Techniques on the Results of an Optimization One unique feature of the strategy optimization methodology is the method for developing strategies by applying induction techniques to the results of an optimization over a representative population. The following discussion describes this feature in detail, describing the process itself, and summarizing the advantages that the strategy optimization methodology provides over current methods.

Procedure

The induction problem can be expressed as follows:
Find a rule R defined over the target population such that $R(c\_i)$ accurately specifies the value $x^*\_i$ for the cases $c\_i$ in the representative population C, using the strategy table to help develop the rule R.

Strategy optimization uses a form of the CART algorithm to perform this induction step, resulting in a strategy represented as a decision tree. However, other induction techniques can be used as well, leading to other representations for a strategy, e.g. fuzzy logic rules.

There are several things to note about this induction step:
The rule R uses some known quantities (the decision keys of $c\_i$) to select another quantity (the assigned actions).
The most accurate decision rule with respect to the representative population is a one for which $r(c\_i)$ is the same as $x^*\_i$, for each $c\_i$ in C.
In many situations, a more complex rule is more accurate on the representative population than a simpler rule. However, often a simpler rule is preferred over a complicated rule because it is easier for a human subject matter expert to comprehend. Complexity can be measured by many ways, such as the length in characters of a computer program that implements a rule.
The preferred embodiment of the invention requires a rule R that is accurate, not 100% faithful. There may be misclassifications in which $R(c\_i)$ does not match $x^*\_i$ for individual cases, but R is supposed to represent the values accurately overall.

Misclassifications may be acceptable as a trade off for a simpler rule. For instance, consider two rules for the same decision situation. Rule R1 assigns the same action to all cases in a certain segment. Rule R2 assigns the same action to all cases in a certain segment, with seven exceptions. Rule R1 may be preferred to Rule R2 because it is simpler, even though rule R2 misclassifies those seven exceptional cases and may have a lower computed objective function than rule R1 because of it.

Advantages

Some key advantages of this approach, i.e. using induction after optimization, include:
59. One can develop strategies in decision situations where one or more of the decision keys are continuous quantities such as "income." In these situations, it is impossible to create a representative population that includes all possible cases.
60. The resulting strategies can be described concisely to a client business executive.
61. The resulting strategies are easier to understand, easier to edit, and more likely to provide insight to a domain expert than the raw strategy table containing thousands of individual cases. This allows the application of expert judgment and domain expertise to adjust the raw results of the optimization.
62. The resulting strategies can be less susceptible to the problem of "overfitting" to the representative population. Overfitting is a phenomenon where a strategy works well on the population it was developed with, but works poorly on other similar populations.

A main design requirement of the induction step is to provide output in a form that is easily digestible by decision engine software. Because all of the decision engine software uses tree constructs, it is preferred to induce trees from the strategy table.

An Exemplary Embodiment

An organizing concept of the preferred embodiment is model-based and data driven strategy optimization (MD-DDSO). This is shown in FIG. 1, in which strategies 10 are developed based upon the application of historical and designed data 12, and analyst judgement 11 to an action-based predictive modeling module 13. A decision model structure 14 results, which may be further revised by human input, i.e. that of analyst judgement 11. The decision model structure is used to produce the decision model 15. The decision model is subjected to both simulation 16 and optimization 17 by which strategies are evaluated and optimized. The simulation results 19 may be separately output. The optimized decision model is provided to a strategy editor 18 for further revision via analyst judgement 11, and resulting strategies are output for application to real world problem solving.

The MDDDSO supports the development of strategies given both data and human expertise. Much attention has been given to: 1) allowing user and expert interaction in all phases of strategy development, as well as 2) allowing the system to run in an automated fashion if deemed useful. Human expertise is captured both through models and in interactive guidance of the model building and strategy induction processes. Given data, the strategy optimization invention both generates strategies and revises them.

The presently preferred embodiment of the invention provides a smooth transition from current strategy analysis techniques to the full MDDDSO capabilities. The presently preferred embodiment includes such capabilities as a user-driven decision tree editor for use in strategy profiling and data-driven strategy development, provide the first steps away from current strategy design practice. The presently preferred embodiment of the invention also allows the evaluation of strategies against simulation models and the sole use of expert judgement to build models from which strategies can be derived.

Strategy Design

The following discussion provides background on strategy design.

Organizations and Objectives

An organization seeks to achieve specific objectives, such as the maximization of profit, by making decisions. In domains such as e-business or credit card application processing where a decision situation is to be evaluated over a large number of cases, the decision making for individual cases often is delegated to an automated agent, such as a decision engine running on a computer. A decision is delegated to an agent by designing a strategy, which is a set of rules specifying the decision for the agent to make in any possible case.

Automated strategies involving initial credit limit assignment, cross-selling, or other account management decisions are common. For the most part, these strategies are designed through expert judgement with no explicit assessment of how the strategies achieve the organization's objectives.

Decision Situations

A strategy is designed for execution in a decision situation. For example, Fair Isaac's TRIAD strategies are designed for account management decisions within a real-time mainframe environment. The kinds of strategies and decision-making capabilities needed differ with the decision situation. The major dimensions of a decision situation are:
Who are the decision makers? Is it a single person or a group of people? If it is a group what is the responsibilities of each person in the group.
What is the relation of the decision to other decisions that the decision maker faces? Is the decision independent of other decisions or dependent?

Is the decision a one-off decision or a repetitive decision?
  Is the decision going to be made only once or is it going to be made hundreds or millions of times?
What is the magnitude of what's at stake in the decisions? Are the stakes large or small on each decision?
What is the availability of data on analogous decisions? Is there historical data that records the circumstances and values historical decisions?
What is the availability of expertise on the decisions or on components of the decisions? Is there significant expertise on this decision or components of the decision or is no human expertise available?
For repetitive decisions, what is the rate that the underlying situations change over time?
What is the time horizon over which the decisions re evaluated?
What is the amount of time available to make each decision?
What is the amount of interaction that a decision maker has in making the actual decision?
How quickly does the decision/strategy need to be put together?
How much and how important is the uncertainty in the decision situation?
A few example decision situations are as follows:
The typical customer management situation: many repetitive decisions with relatively little at stake in each decision. There is a significant amount of uncertainty in the decision situation, e.g. good/bad, revenue, and attrition. Historical data are typically available, as well as expertise in making predictions about important variables in the situation. The rate at which the underlying situation changes is on the order of months. The time horizon over which each decision is evaluated is 6-18 months.
The strategic corporate decision environment: a single decision that is very high stakes, such as the acquisition terms in a corporate takeover. A small group of well-coordinated decision makers. The time horizon over which the decision is evaluated may be long, e.g. quarters, years.
The strategic public policy decision environment: a single decision that is very high stakes and for which there is a diverse set of stakeholders with significantly different objectives. An example is the siting of a nuclear waste disposal site. The time horizon over which the decision is evaluated may be very long, e.g. many years.
The Internet advertising environment: many repetitive decisions but no human expertise and no human intervention in the decision making process. Time horizon for evaluating the decision is very short, e.g. click-through rate.

Usually there is a significant amount of low level information about a decision situation. For example, in account management, one has all the low-level data in the master file and in the credit bureau to consider in addition to whatever other information might be available, e.g. account application information. One of the first tasks in building an optimal strategy is to define the high-level features, i.e. decision keys, on which the strategy is based. Defining the features and developing algorithms to compute them from the low-level information is known in artificial intelligence as the signal-to-symbol transformation and is critical to the process of building optimal strategies.

Strategies

A central concept of the invention is that of a strategy. A strategy maps the observable characteristics of a situation to at least one action that the client can take. The typical situation analyzed is an account or customer of the client, but it could be an entire portfolio. Cases are described by a set of decision keys, each of which has an attribute space of allowable values. The decision key space is the cross product of the attribute spaces of all decision keys. The decision key space represents the entire set of allowable situations. A point in the decision key space represents a specific situation, i.e. each characteristic in the situation description takes on a unique value.

The set of legal actions is called the action space. As with situations, there can be dimensions of the action space. For example, in making a loan offer, the dimensions of the loan offer includes APR, % down required, terms of the loan, etc.

A deterministic strategy is a strategy that for each point in the decision key space designates a single point in action space. In contrast, probabilistic strategies associate a single point in decision key space with some probability distribution of points in action space. Probabilistic strategies, e.g. optimal strategies in bandit, are often useful in gaming situations and in repetitive decision situations where learning about the situation is an important component of the objective function. Champion-challenger is a probabilistic strategy.

If the decision key space is discrete, the most common representation for a strategy is a table. To each point in the decision key space, at least one action is assigned from action-space. A more sophisticated representation for a strategy over a discrete decision key space is a tree that coalesces common regions of space together.

If the decision key space is continuous, it is not possible to lists all the values of the decision key space in a table. The typical representation is the decision tree, which partitions the decision key space into segments in such a way that all the points in each segment have the same optimal action. In a decision tree, each branch of the tree represents a specific volume of the decision key space and has associated with it at least one specific action from the action space. There are many other ways that strategies can be represented. In fact, any functional form that can map from the decision key space to action space can represent a strategy, e.g. neural networks, computer programs, and tables.

Action Segments

A decision tree segments a population into subpopulations, with one subpopulation for each leaf or segment of the tree. The subpopulation is defined by the splits or branches made between the root of the tree and the leaf. Each branch, i.e. interior node, of the tree has associated with it a split variable and a split value. The split variable is the independent variable that is splitting the population at the node.

In the strategy process it is important to define action segments, or segments to which a single action is the right thing for everybody in that segment. Action segments typically have a clear conceptual definition behind them. For example, in an attrition strategy one might want to treat accounts differently as a function of their attrition likelihood and profit potential, as listed in Table 1.

TABLE 1

An attrition strategy

| Segment | Attrition Likelihood | Profit Potential | Action |
|---|---|---|---|
| 1 | High | High | aggressively defend and rebuild customer relationship |
| 2 | Low | High | build and sustain customer relationship |

TABLE 1-continued

An attrition strategy

| Segment | Attrition Likelihood | Profit Potential | Action |
|---|---|---|---|
| 3 | High | Low | low cost maintenance |
| 4 | Low | Low | choose to lose |

Historical Data

There are two kinds of historical data that are based on strategy execution: performance data and strategy data. Performance data describes situation information, e.g. account information, as well as information about the performance of that account, e.g. good/bad, revenue, attrition, etc., with respect to defined performance measures. These performance measures do not have to be the bottom-line measures, e.g. profit, but could be. Strategy data describes a situation (x) and gives the optimal action (a) for that situation. Strategy data is typically derived from models or historically through the development of historical action functions.

EXAMPLE

The following is a simple example to illustrate the concepts presented above. Assume a typical decision situation. Assume a decision situation having many repetitive decisions with relatively little at stake in each decision. There is a significant amount of uncertainty in the decision situation, e.g. good/bad, revenue.

Figure 2A:
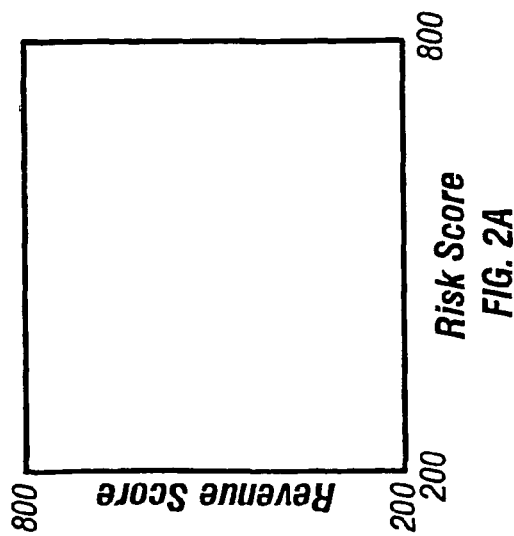
FIG. 2 is a graph showing a decision key space according to the invention.
Figure 2B:
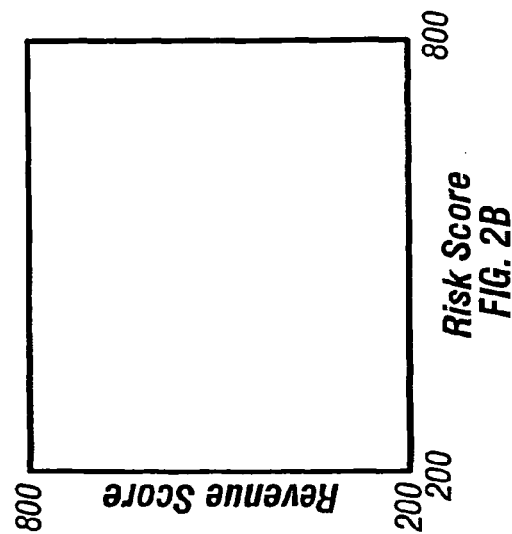

Assume that the decision key space is made up of three dimensions: a risk score, a revenue score, and delinquency, e.g. 0, 1+cycles. Assume that the scores are continuous-valued between 200 and 800. The decision key space can be pictured as shown in FIG. 2.

Assume that the action space is a single dimension that is a credit line adjustment decision. Assume that there are three alternatives to credit line adjustment are: decrease to current balance+10%, no change and increase credit line by 10%.

Figure 3A:
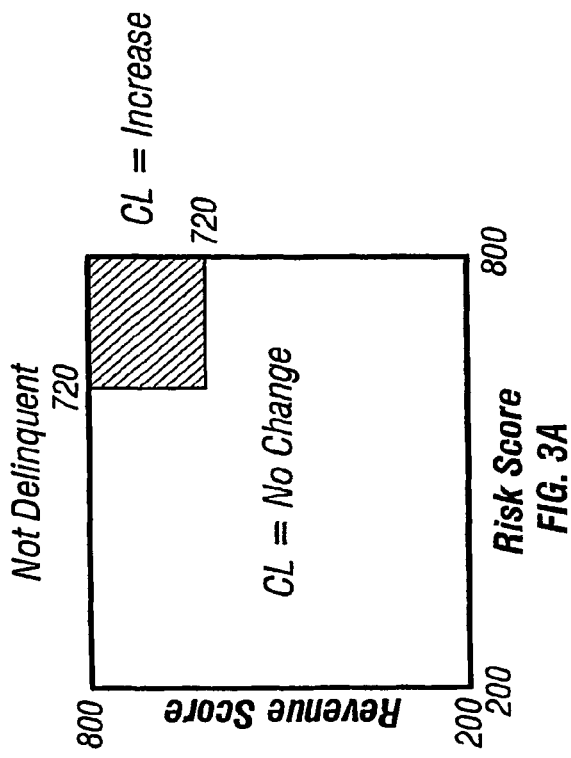
FIG. 3 is a graph in which strategy shown over decision key space according to the invention.
Figure 3B:
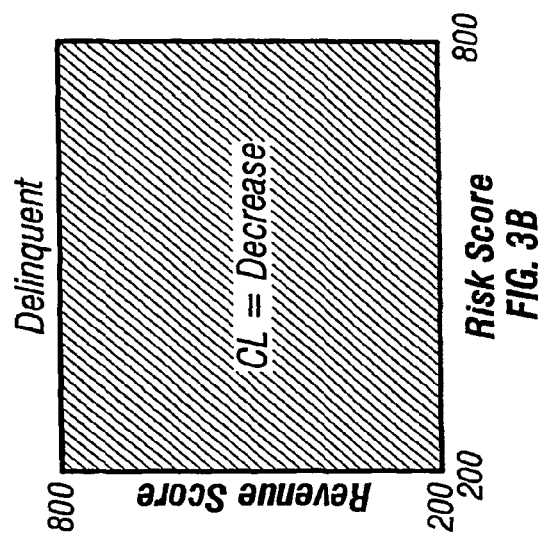
Figure 4:
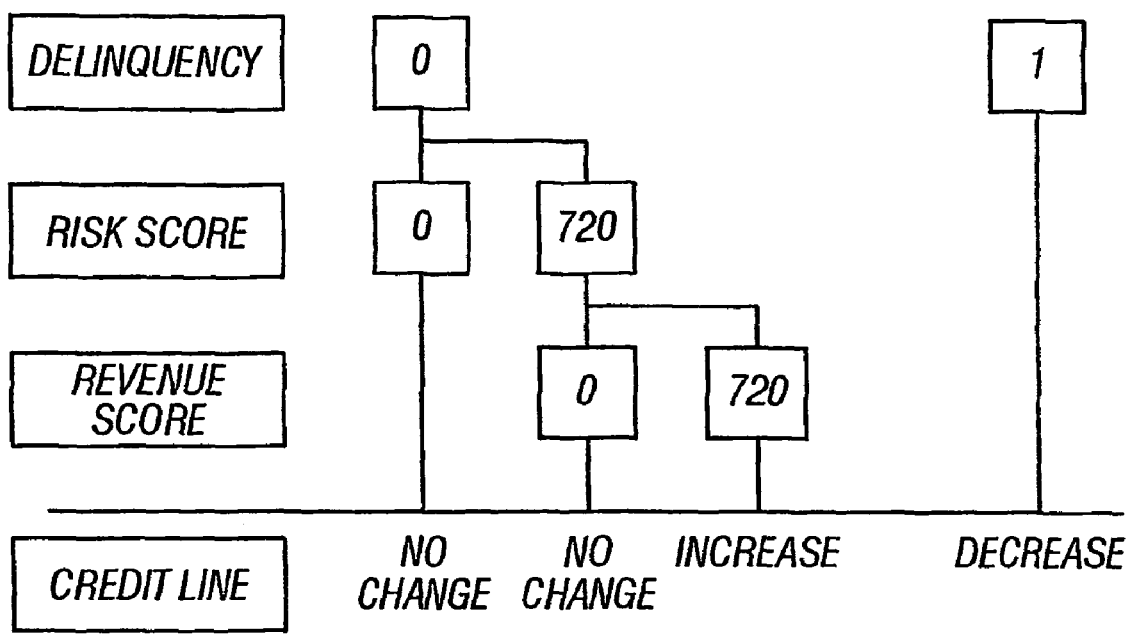
FIG. 4 is a tree diagram showing an equivalent decision tree according to the invention.

In this context, a strategy is any function that maps a particular set of values of risk score, revenue score, and delinquency, i.e. a point in this decision key space, to one of the actions, "CL=decrease", "CL=no change", "CL=increase," i.e. a point in the action space. An example strategy is shown below in rule format:

If an account is delinquent (1+cycles), CL=decrease.
Else if, an account is not delinquent and the risk score is greater than 720 and the revenue score is greater than 720 then increase
Else, CL=No Increase The strategy can also be shown in decision key space (FIG. 3), and in a decision tree (FIG. 4).

One surprising fact about strategies and decision trees is that every strategy can be represented in a large number of equivalent structures, e.g. different decision trees. In the example above, one could add an additional segment "revenue score," e.g. 0-360, 360-720, and 720-800, but as long as the 0-360 and the 360-720 scenarios have "No Change" associated with them, the strategy is the same. How to choose a structure? A general rule of the thumb is to minimize the number of segments in a strategy, or the number of rules, used to describe a strategy. That is, it is desirable to have as many segments as necessary but no more.

If the segments are chosen such that one or more segments contain situation points that have different optimal actions, an optimal strategy is not possible. For example, assume that the strategy shown in FIGS. 3 and 4 are optimal. If the revenue score and the risk score are segmented by the set (200-400, 400-600, 600-800) only a crude approximation to the optimal strategy is possible.

In general, there is a trade-off between performance and interpretability of strategies. Interpretability is a function of the number of segments, e.g. fewer segments are more interpretable, and the complexity of the segmentation description. One can often drastically reduce the number and complexity of segmentations in a strategy for a relatively small performance degradation. It is usually important in strategy situations, that the segmentations be easily interpretable.

Strategy Design

Strategy design is primarily achieved with human expertise. Strategies typically are developed by strategy consultants with significant, specific industry experience in designing and applying strategies.

Scores can be extremely important to optimal strategy design. For example, in the simple situation, e.g. account acquisition, where there is a binary decision, e.g. accept/reject, and only one variable, e.g. good/bad, that directly impacts the objective, e.g. profit, a sound decision-theoretic result is that the decision can be based on thresholding of the risk score. The exact score threshold that is used depends on the relative costs of acceptance of a bad applicant and the benefits of accepting a good applicant.

There are now significantly more complicated prediction and strategy design situations. The need to handle customer-based, in addition to account-based, predictions and the need to predict bottom-line performance, e.g. profit, rather than components of profit, e.g. risk, revenue, and attrition, are two major challenges for the development of prediction technology. Users are not only faced with the need to adapt to the new predictors that are developed but also to new and rapidly changing decision areas. For example, "How can a company help it's clients make real-time decisions to cross-sell one or more products in a large range of product offerings given all that the client knows about a particular customer?"

While human expertise is certainly a critical component of strategy design, as it is in scoring, bringing the same kind of analytic support to strategy design that has been applied to predictions can be a major technological leap forward.

In particular, strategy design is a problem of decision making under uncertainty. Because decision analysis is the primary technology for optimization of decisions under uncertainty, decision analysis techniques and tools are relevant to strategy design.

Description of Strategy Optimization

The strategy optimization invention disclosed herein is an overall architecture for optimal strategy design using both historical data and human expertise. In the following discussion, strategy optimization is described in terms of the kinds of objects it manipulates, the functions for transforming objects and the use cases which organize the functions into particular configurations.

Objects

The strategy optimization invention manipulates three major types of objects: strategies, data, and models. In addition the invention manipulates: decision keys, decisions, action scenarios, and variable functions. These entities have complex relationships. For example, data can be used to create variable functions. Data can be used to pass through strategies as they are created. Models can result in a strategy, through an optimization process, and can use strategies as input for a simulation process. Strategies can be built with historical data or strategy data. Strategies can also be built by an analyst without any data or any model. Strategies can be evaluated by simulation with a model or with historical data.

Strategies

Strategies can be represented as a decision tree. Decision trees are segmented with decision keys and at least one action is associated with each leaf of the tree.

Strategies have a: Decision key set, Decision variables set, Action set, and Decision tree.

Models

Influence diagrams are used in the preferred embodiment as the basis for a modeling language. Several modifications are made to the influence diagrams language to create the herein disclosed modeling language.

Data Sets

The preferred embodiment makes use of two kinds of data sets: historical data and strategy data. A data set is an array of values. Each column in a data set has an identifier.

Decision Keys

Decision keys are variables that are observed at the time of a decision and on which the strategy for that decision may be based.

Decision keys have a categorical or continuous value range and a set of decisions for which they are relevant.

Decision Variables

Decision variables represent actions under the control of the agent. Decisions have a categorical or continuous value range, a set of relevant decision keys, and a set of relevant action scenarios.

Variable Functions

Variable functions predict the value of a variable based on a set of input variables. Variable functions are assessed both from expert judgement and learned from data. Variable functions can be the output of the action-based predictor module.

Variable functions have three distinct sets of variables: a predicted variable, a set of input variables, and a function of the input variables.

Functions

There are six major functions in the preferred embodiment:
Strategy simulation and evaluation
Strategy editing
Action based prediction
Model construction
Strategy optimization
Data-driven strategy development
These functions are described below.

Strategy Simulation and Evaluation

The analyst can evaluate the segmentation tree of a strategy with respect to a given performance measure by applying it to an existing historical dataset. The criteria for evaluation include the purity of the segments, the number and complexity of the branches, the misclassification with respect to the performance measure, and the plausibility of the segmentation. This data based simulation is a component of current strategy analysis and also includes tools such as lift curves.

The preferred embodiment extends the simulation capabilities by providing simulation based on models only or on a combination of models and data. The simulation model can either be a decision model, i.e. an influence diagram, or a separate simulation, compatible simulation programe.g. Portfolio Forecasting and Strategy System, a Fair, Isaac invention to forecast the portfolio results for alternative strategies.

Strategy Editing

The analyst can edit a decision tree in numerous ways including creating new trees from existing trees, creating and deleting subtrees, and copying and pasting subtrees. The analyst can work with a single tree or with multiple trees at once. The analyst can start from scratch or from an existing decision tree, such as one created through strategy optimization.

Data-driven Strategy Development

The analyst can build a decision tree with interactive computer support: The preferred embodiment automatically suggests optimal segmentations with respect to a given historical performance dataset. Data-driven strategy development is achieved through the interactive induction of segmentation/decision trees from performance data or strategy data.

Action-based Prediction

Action-based prediction is the development of a predictive model for a dependent variable that includes at least one actions, i.e. decisions, as independent variables. A variety of model-building methods are available, for example regression, score-engineered predictive models, Bayesian Network learning, and neural networks. The system allows the user to place constraints, i.e. score-engineer, on the model-building processes.

The preferred embodiment provides analysts with ways to guide the prediction process and to directly edit the predictors. The user is able to visualize and edit variable functions.

Extensions of Optimal Strategy Design by a Learning Strategy

The notion of optimal strategy applies to either deterministic or probabilistic strategies. Probabilistic strategies are often preferred when it is envisioned to re-optimize a decision model from time to time, each time based on new evidence from new data. Then it is possible to develop more optimal strategies at a later time, by maximizing the amount of information in the data, which are generated under the strategies deployed at an earlier time. Such data that are generated with the goal of learning in mind are designed data. One important goal of learning is the accurate inference of causal relationships. Strictly speaking, it is not possible to infer causal relationships without randomization. Randomized strategies present a solution to this problem. Another goal of learning is to explore a wide space of strategies so that it is possible to react swiftly to external changes. Randomized strategies can be designed to generate data, which allow for the development of an action-based predictive modeling module that predicts with accuracy and confidence over a wide operating range. A randomized strategy designed with these goals in mind is referred to as a learning strategy. A learning strategy generates designed data at minimum cost, and subject to business and operational constraints, including case and portfolio level constraints, constraints on test sample size, the maximum allowed number of test cells, and constraints on factor combinations making up for these test cells.

A learning strategy is an optimal strategy running in parallel with such designed experiments. Tools from the science of experimental design, including full and fractional factorial designs, constrained optimal designs, screening designs., and response surface designs, are used to design experiments. The experiments are applied to a random fraction of accounts in such a way that these action values deviate from the optimal actions in a controlled fashion. Both the fraction of accounts submitted to experiments and the range of action values affect the short-term cost of experimentation and the long-term benefit from learning.

The value of the learning strategy is calculated using a time-discounted cost/benefit analysis. The method requires assumptions on the prior distribution of the unknown true optimum and the risk aversion of the decision maker. Furthermore, it is possible to optimize the value of learning based on these assumptions.

Model Construction

Model construction is directed by an analyst through the user interface and involves problem framing, variable identification, model structuring, and variable function definition.

Problem framing. The analyst determines the decisions to be made, the information known at each decision, i.e. the decision keys, the objectives to be optimized, and the constraints to be met. The information structure determines how many stages, or discrete time periods, there are in the decision model. In a single stage model, the same information is known at all decisions, while in a multi-stage model, more information is known at later decisions than at earlier decisions. For instance, a model with a single decision is a single stage model. The number of decisions in each stage determines the dimensionality of the model. Multi-dimensional decision models have multiple decisions made at a single point in time. In credit card direct marketing, for example, decisions regarding offer parameters such as teaser rate and balance transfer rate constitute the multiple dimensions of the offer stage.

Variable identification. The analyst identifies variables relevant to the strategy. The analyst classifies variables as decision keys, e.g. scores, decisions, objective function, constraints, or intermediate variables.

Model structuring. The analyst specifies the structure between the variables using influence diagrams. Expert judgement is the primary method, but there are also Bayesian Network learning methods that could be used in certain situations.

Variable function definition. The analyst quantifies the relationship between the variables as conditional probability tables or as mathematical formulas. The analyst can use expert judgement or a data-based action-based prediction method such as regression, Bayesian network learning, or neural networks.

Strategy Optimization

The analyst can find an optimal strategy for a decision situation expressed as a decision model. When there are no constraints in the objective, each combination of decision keys can be optimized separately: traditional influence diagram algorithms are sufficient to solve these individually. If there are global constraints, the optimizations for each combination of decision keys are coupled.

The preferred embodiment provides functionality for both types of problems. It can also induce a decision tree from a strategy dataset using the induction techniques of classification tree algorithms.

Decision Engine Interface

The preferred embodiment writes strategies to and read strategies from decision engines.

Use Cases

The following discussion lists five use cases envisioned for the strategy optimization invention and describes the tasks an analyst can perform under each.

Strategy Simulation

An analyst evaluates the structure, the performance by segment, and the overall performance of an existing strategy by applying it to historical data. This is also called strategy profiling. The analyst can compare multiple strategies at the same time.

By building a probabilistic model that incorporates the strategy, as well as other variables, the analyst can assess the impact of the strategy on higher-level objectives such as profit.

Manual Strategy Design

Figure 5:
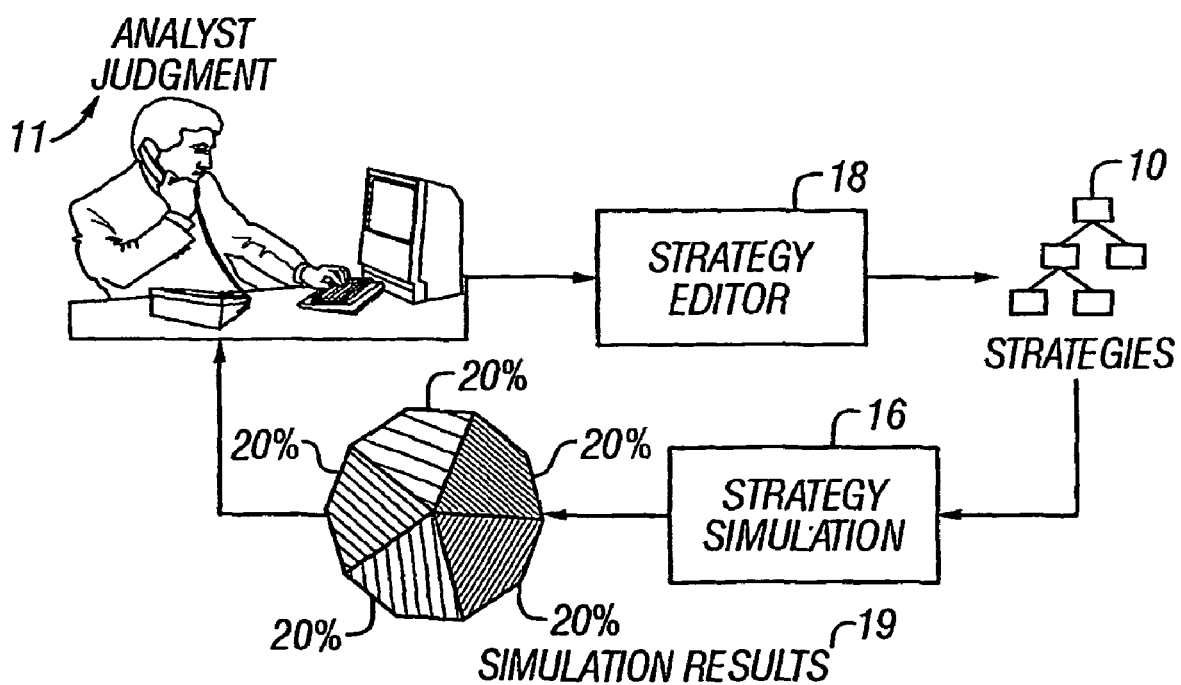
FIG. 5 is a block schematic diagram showing a manual strategy design according to the invention.

FIG. 5 shows the strategy design cycle for this use case. An analyst builds a decision tree manually using expert judgement. The analyst first specifies decision keys and at least one action scenario. Next, the analyst grows the tree by splitting branches one at a time, selecting a decision key and segmentation at each split. The analyst assigns at least one action scenario to the leaves of the completed tree. Finally, the analyst evaluates the effectiveness of the strategy using strategy simulation. Having evaluated the strategy, the analyst can fine tune the strategy and start the cycle again.

Strategy Design with Data

Figure 6:
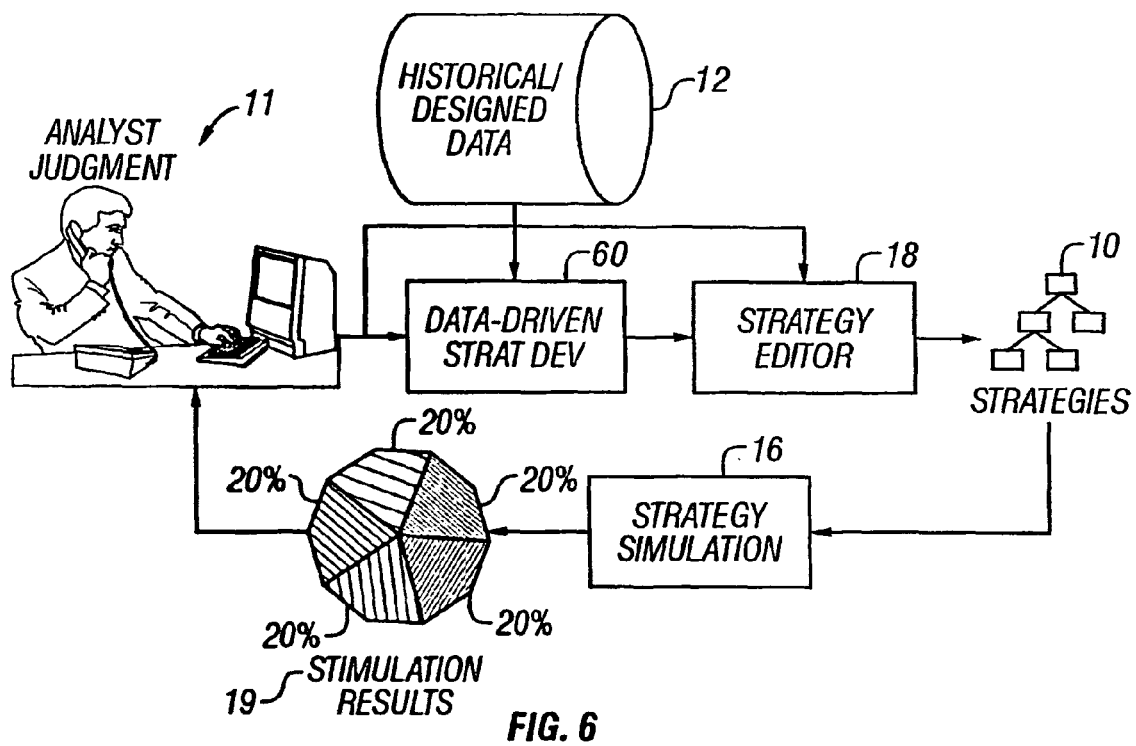
FIG. 6 is a block schematic diagram showing a strategy design with data according to the invention.

FIG. 6 shows the strategy design cycle for this use case. An analyst builds a decision tree as above (manually), using historical data to help select segmentations and to profile tree segments. The analyst can accept the splits generated automatically by the strategy optimizer or he can edit them in any way.

This use case exercises the data-driven strategy design and strategy editing functions 60 and could use the strategy simulation module also.

Model-based Strategy Design

Figure 7:
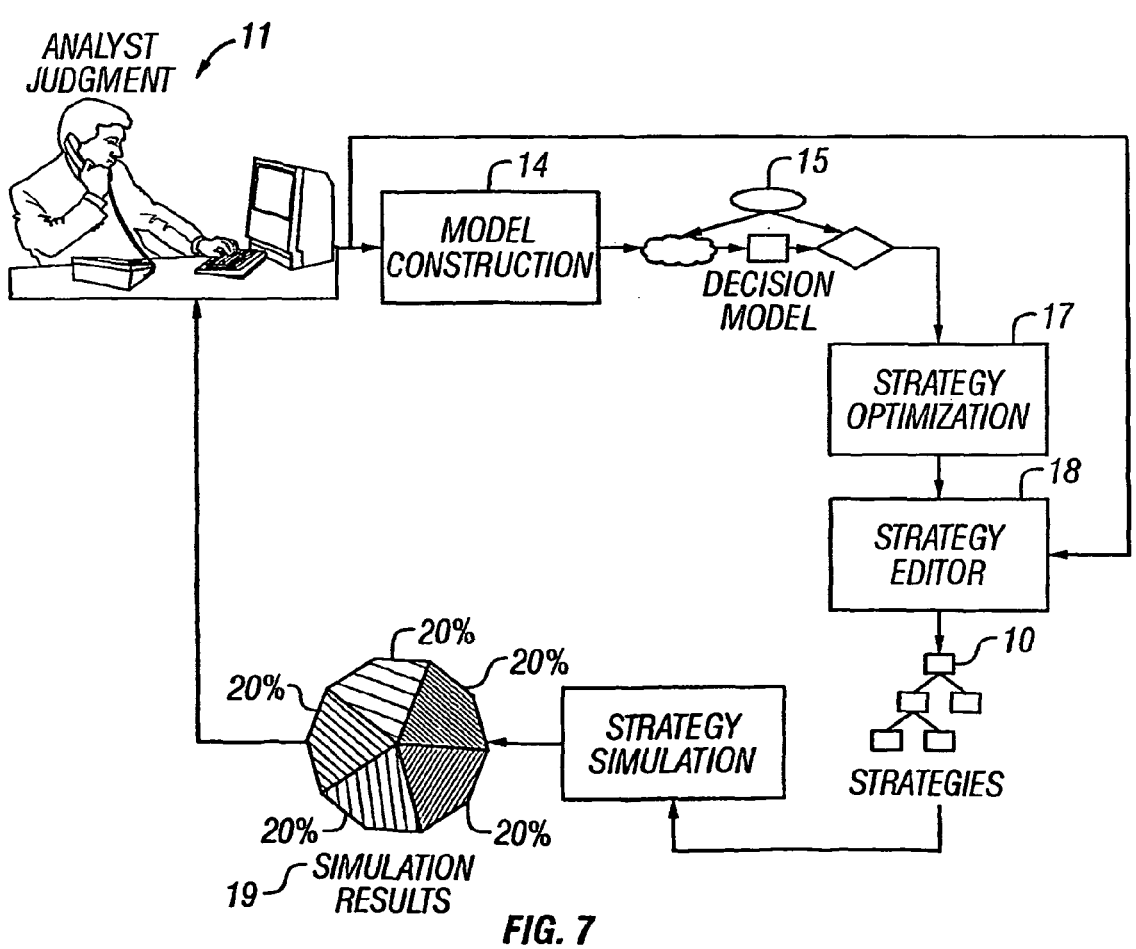
FIG. 7 is a block schematic diagram showing a model-based strategy design according to the invention.

FIG. 7 shows the strategy design cycle for this use case. An analyst creates a quantitative model using expert judgement that relates the decision keys, the decisions, the objective, and the constraints, using the model construction function. The analyst then derives an optimal strategy from the model, using the strategy optimization function. The analyst can modify the strategy using the strategy editing function as in the previous use cases. The simulation function could be used to evaluate the strategy. This use case was demonstrated in research on risk-based pricing (see R. Oliver, R. Fung, *Better Decision Strategies Through Data and Models with an Application to Risk Based Pricing*, Fair, Isaac Technology Seminar (Jan. 29, 1998).

Model-based Strategy Design with Data

Figure 8:
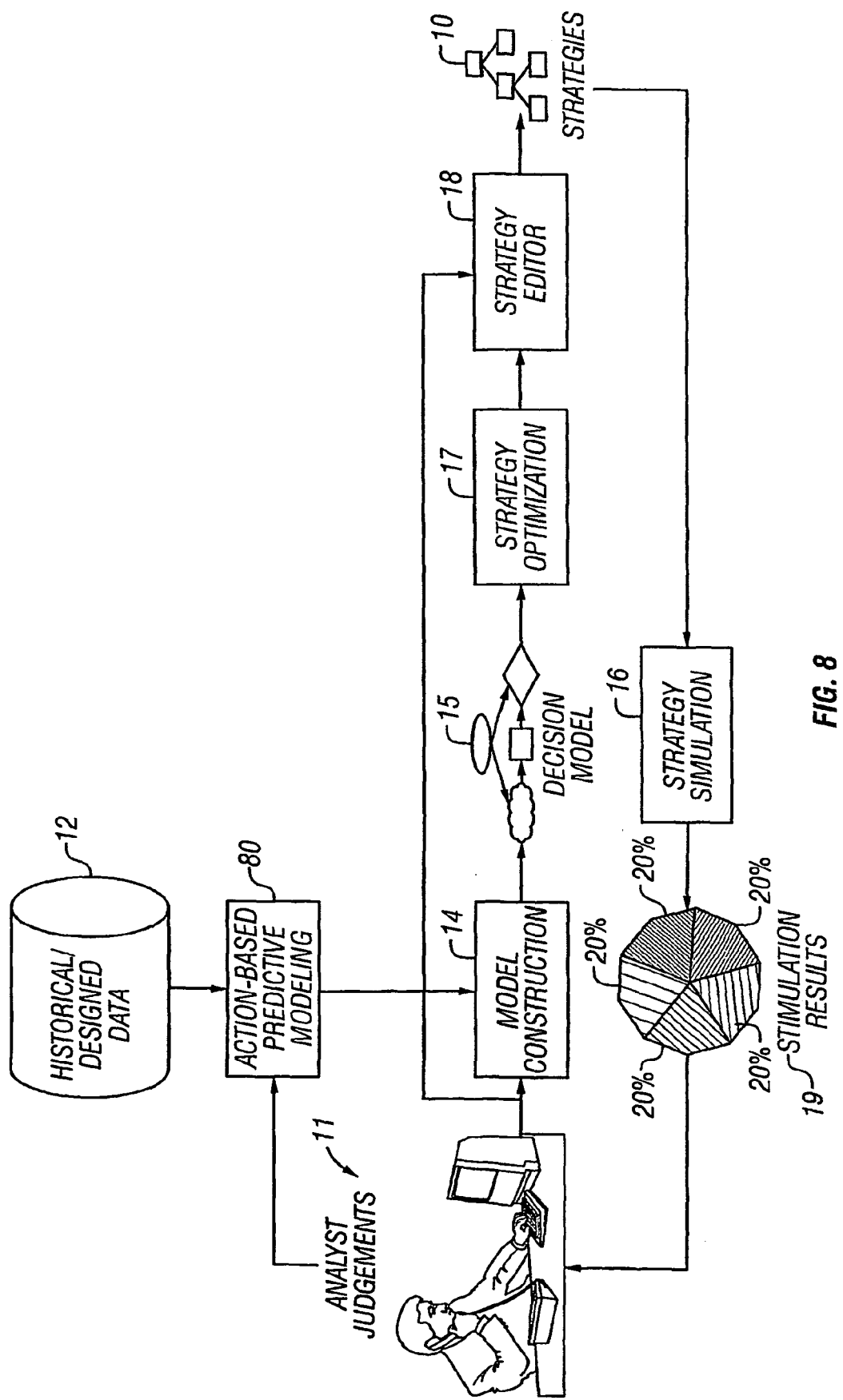
FIG. 8 is a block schematic diagram showing a model-based strategy design with data according to the invention.

FIG. 8 shows the strategy design cycle for this use case. This use case uses all the capabilities of the preferred embodiment. Given a data set, the action-based predictor function 80 is used to learn one or more of the variable functions in the model.

Comparing Model-based and Data-driven Approaches

In general, the model-based approach provides a significant leap in strategy performance because it offers the promise of approximately optimal performance.

The data-driven approach is much easier to use because it is much closer to the ways things are done now.

The normal process of strategy development involves initial strategy development and then evolution of strategies through execution, experimentation, and performance analysis. Initial strategy development is usually done primarily with human expertise. The model-based module can be used to guide this process. Performance analysis can be achieved through the data-driven module. Both the model-based module and the data-based module can be used to derive new strategies with data.

Given a particular segmentation and a model of the situation, a cardinal ordering of the decision alternatives can be derived for each segment. If many decisions are close to the optimal these should probably be tried and a single challenger strategy can be derived that simultaneously tries out these close alternatives for different segments.

Questions about Model-based Analysis

Where do the Numbers Come from?

The model-based approach requires a significant number of structural and quantitative judgments from experts. While using expert judgment is now the only method by which strategies are developed, in scoring this is completely opposite—judgments are frowned upon, data is the only way to develop predictions.

How does the Invention use Scores?

The model-based module must translate the relative risk ranking of scores to measure probabilities, i.e. odds. This is absolutely necessary for decision making and is clearly understood by strategy consultants.

How can Decision Situations with Multiple Part. i.e. Vector, Decisions, e.g. Credit Limit, APR, be Handled by the Architecture?

This is straightforward. Each part of the decision is considered as a separate decision and sequenced according to the analyst's preferences.

Can Continuous Decision Spaces be Handled?

The prototypical decision is categorical and is the easiest to handle but continuous decision variables are possible. It preferably requires a fast nonlinear optimization routine because the form of the objective function is not known in general. Discretization of the continuous variable is another possibility.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for using strategy optimization, the method being implemented by one or more data processors and comprising:

creating, by at least one data processor, a strategy optimization influence diagram and a representative population to model a decision situation mathematically, the influence diagram graphically representing a decision model, with nodes or shapes representing variables in the decision model, and arcs or arrows between nodes representing relationships between variables;

formatting, by at least one data processor, said strategy optimization influence diagram as a nonlinear optimization problem over a representative population;

using, by at least one data processor, nonlinear optimization techniques to assign at least one action to each case in a representative population;

creating, by at least one data processor, a strategy table containing all cases in said representative population, along with at least one assigned action for each case;

applying, by at least one data processor, induction techniques to said strategy table to derive a set of rules from data; and operationalizing, by at least one data processor, a set of rules derived by induction through a decision engine;

wherein said formatting said strategy optimization influence diagram as a nonlinear optimization problem over a representative population formulates a nonlinear optimization problem that substantially corresponds to a decision model specified in a modeling language;

wherein an optimal solution to said decision model can optionally be determined by using integer programming;

wherein a decision model is used an input to said strategy optimization influence diagram;

wherein said formulating a given decision model as a nonlinear optimization problem further comprises:

specifying, by at least one data processor, cases in said representative population;

constructing, by at least one data processor, feasible actions for a decision for each case; and specifying, by at least one data processor, an objective function of said optimization, wherein said constructing feasible actions for a decision for each case comprises:

notating, by at least one data processor, a set of feasible actions for each case as $A\_i$; wherein $A\_i$ is a function of case-level constraints;

for each case $c\_I$ instantiating, by at least one data processor, said decision keys E according to that case;

for each case-level constraint $K\_j$ computing, by at least one data processor, a set $A\_{ij}$ of feasible decisions;

setting, by at least one data processor, $A\_i$ to be a set of all actions in A that are feasible for all constraints, such that, $A\_i$ is the intersection of the sets $A\_{ij}$;

computing, by at least one data processor, a set $A\_{ij}$ of feasible decisions by selecting a method appropriate to a type of case-level constraint, wherein:

for constraints of type "If $q\_j(E)$, then x in $S\_j$" computing a logical predicate $q\_j (E)$;

if $q\_j(E)$ is true, then setting $A\_{ij}$ to $S\_j$;

if $q\_j(E)$ is false, then setting $A\_{ij}$ to A; wherein all possible actions are feasible; for constraints of "$h\_j (E, x)<d\_j$" setting $A\_{ij}$ to an empty set:

for each alternative action a in A computing a value of $h\_j(E, a)$;

if $h\_j(E, a)<d\_j$, then adding a to $A\_{ij}$.

2. The method of claim 1, wherein said influence diagram comprises any of a Bayesian network, Bayes' Net, and Bayesian model.

3. The method of claim 2, wherein said modeling language comprises any of:

constraining, by at least one data processor, optimization by associating a set of constraints with said decision model;

performing, by at least one data processor, dataset-based optimization over an explicitly specified set of cases; and mapping, by at least one data processor, said decision model to a dataset file, wherein each decision key in said decision model is mapped with a column in a dataset.

4. The method of claim 1, wherein said modeling a decision situation formulates and specifies a decision situation as a decision model, using a modeling language based on influence diagrams.

5. The method of claim 1, wherein said specifying cases in said representative population comprises:

selecting, by at least one data processor, one of any of the following methods for specifying a set of cases:

using, by at least one data processor, a set of cases from a previously encountered decision situation;

any of creating, designing, and specifying a set cases manually;

drawing, by at least one data processor, samples from a joint distribution of decision key variables in said decision model using Monte Carlo methods; wherein a joint probability distribution is defined over said decision key variables; and enumerating, by at least one data processor, all possible cases; wherein a set of possible combinations of values of said decision keys is finite.

6. The method of claim 1, wherein said specifying an objective function of the optimization comprises:

notating, by at least one data processor, said objective function by $F(C,X,W)$;

selecting, by at least one data processor, a functional form for $F(C,X,W)$, including any of:

a sum of some function $f(c, x(c))$ over all cases in C, or $Sum\_(c\ in\ C)\ \{w(c)*f(c, x(c))\}$ a mean of some function f(c, x(c)) over all cases in C, or a ratio of Sum_(c in C) {w(c)*f(c, x(c))} to Sum_(c in C) {w(c)} a mean or sum of some function f(c, x(c)) over a subset of cases in C; and a sum of some function f2(c, x(c), m) over all cases in C for all possible instantiations m of portfolio variables in U, or Sum_(c in C, m in M) {P(U=m)* w(c)*f(c, x(c), m)}.

7. The method of claim 6, wherein a resulting nonlinear optimization problem is stated as:

selecting, by at least one data processor, values for all variables x_i in X to maximize F(C,X,W);

subject to the constraints:

x_i is in A_i (for all i in 1 to N_C); and

G_j(C,X,W)<=b_j (for all j in 1 to N_T); and once formulated as a nonlinear optimization problem, optionally optimizing, by at least one data processor, said decision model by using integer programming:

wherein a strategy table is output with a row for each case c_i in a representative population C, one column for each decision key of case c_i, and a column for an optimal action x*_i assigned to case c_i.

8. The method of claim 1, wherein said specifying an objective function of the optimization comprises:

computing, by at least one data processor, a component function f(c, x(c)), which is a sum of a value of value variables, evaluated at each case, for each case c by:

setting, by at least one data processor, said decision keys in said decision model according to c;

then setting, by at least one data processor, a decision according to x(c);

then evaluating, by at least one data processor, all variables in a network; and then evaluating, by at least one data processor, a sum V_1+ V_2+...+V_N_V.

9. The method of claim 1, wherein said induction techniques comprise:

using, by at least one data processor, any of induction techniques which include Bayes Net Learning, and CART (Classification and Regression Trees).

10. The method of claim 1, wherein said induction techniques comprise:

developing, by at least one data processor, any of decision rules and strategies to express accurately how to assign at least one action to each case, based on its decision keys.

11. The method of claim 1, wherein said induction techniques comprise:

finding, by at least one data processor, a rule R defined over a target population, such that R(c_i) accurately predicts a value x*_i for cases c_i in a representative population C; and using, by at least one data processor, a strategy table to help develop said rule R.

12. The method of claim 11, wherein said rule R uses decision keys of c_i to either of compute or predict at least one assigned action.

13. The method of claim 11, wherein a most accurate decision rule is a rule for which r(c_i) is the same as x*_i, for each c_i in C.

14. An apparatus for using strategy optimization, comprising:

means for generating a strategy optimization influence diagram and a representative population for modeling a decision situation mathematically, the influence diagram graphically representing a decision model, with nodes or shapes representing variables in the decision model, and arcs or arrows between nodes representing relationships between variables;

means for formatting said strategy optimization influence diagram as a nonlinear optimization problem over a representative population;

means for using nonlinear optimization techniques to assign at least one action to each case in a representative population;

means for generating a strategy table containing all cases in said representative population, along with at least one assigned action for each case;

means for applying induction techniques to said strategy table to derive a set of rules from data; and means for operationalizing a set of rules derived by induction through a decision engine;

wherein said means for formatting said strategy optimization influence diagram as a nonlinear optimization problem over a representative population formulates a nonlinear optimization problem that substantially corresponds to a decision model specified in a modeling language;

wherein an optimal solution to said decision model can optionally be determined by using integer programming;

wherein said means for formulating a given decision model as a nonlinear optimization problem further comprises:

means for specifying cases in said representative population;

means for constructing feasible actions for a decision for each case; and means for specifying an objective function of said optimization;

wherein said means for constructing feasible actions for a decision for each case comprises means for:

notating a set of feasible actions for each case as A_i; wherein A_i is a function of case-level constraints;

for each case c_I instantiating said decision keys E according to that case;

for each case-level constraint K_j computing a set A_ij of feasible decisions;

setting A_i to be a set of all actions in A that are feasible for all constraints, such that, A_i is the intersection of the sets A_ij;

computing a set A_ij of feasible decisions by selecting a method appropriate to a type of case-level constraint, wherein:

for constraints of type "If q_j(E), then x in S_j" computing a logical predicate q_j(E);

if q_j(E) is true, then setting A_ij to S_j;

if q_j(E) is false, then setting A_ij to A; wherein all possible actions are feasible;

for constraints of type "h_j(E x)<d_j" setting A_ij to an empty set for each alternative action a in A computing a value of h_j(E, a);

if h_j(E, a)<d_j, then adding a to A_ij.

15. The apparatus of claim 14, wherein said influence diagram comprises any of a Bayesian network, Bayes' Net, and Bayesian model.

16. The apparatus of claim 14, wherein said means for modeling a decision situation formulates and specifies a decision situation as a decision model, using a modeling language based on influence diagrams.

17. The apparatus of claim 16, wherein said modeling language comprises any of:

means for constraining optimization by associating a set of constraints with said decision model;

means for performing dataset-based optimization over an explicitly specified set of cases; and means for mapping said decision model to a dataset file, wherein each decision key in said decision model is mapped with a column in a dataset.

18. The apparatus of claim 14, wherein a decision model is used an input to said strategy optimization influence diagram.

19. The apparatus of claim 14, wherein said means for specifying cases in said representative population comprises:
means for selecting one of any of the following mechanisms for specifying a set of cases:
means for using a set of cases from a previously encountered decision situation;
means for any of creating, designing, and specifying a set cases manually;
means for drawing samples from a joint distribution of decision key variables in said decision model using Monte Carlo methods; wherein a joint probability distribution is defined over said decision key variables; and
means for enumerating all possible cases; wherein a set of possible combinations of values of said decision keys is finite.

20. The apparatus of claim 14, wherein said means for specifying an objective function of the optimization comprises means for:
notating said objective function by $F(C,X,W)$;
selecting a functional form for $F(C,X,W)$, including any of:
a sum of some function $f(c, x(c))$ over all cases in C, or $Sum\_(c\ in\ C)\ \{w(c)*f(c.\ x(c))\}$
a mean of some function $f(c, x(c))$ over all cases in C, or a ratio of $Sum\_\ (c\ in\ C)\ \{w(c)*f(c, x(c))\}$ to $Sum\_(c\ in\ C)\ \{w(c)\}$
a mean or sum of some function $f(c, x(c))$ over a subset of cases in C; and
a sum of some function $f2(c, x(c), m)$ over all cases in C for all possible instantiations m of portfolio variables in U, or $Sum\_(c\ in\ C,\ m\ in\ M)\ \{P(U=m)*\ w(c)*f(c, x(c), m)\}$.

21. The apparatus of claim 20, wherein a resulting nonlinear optimization problem is stated as:
selecting values for all variables $x\_i$ in X to maximize $F(C,X,W)$;
subject to the constraints:
$x\_i$ is in $A\_i$ (for all i in 1 to $N\_C$); and
$G\_j(C,X,W)<=b\_j$ (for all j in 1 to $N\_T$); and
once formulated as a nonlinear optimization problem, optionally optimizing said decision model by using integer programming.
wherein a strategy table is output with a row for each case $c\_i$ in a representative population C, one column for each decision key of case $c\_i$, and a column for an optimal action $x*\_i$ assigned to case $c\_i$.

22. The apparatus of claim 14, wherein means for specifying an objective function of the optimization comprises:
means for computing a component function $f(c, x(c))$, which is a sum of a value of value variables, evaluated at each case, for each case c by:
setting said decision keys in said decision model according to c;
then setting a decision according to $x(c)$;
then evaluating all variables in a network; and
then evaluating a sum $V\_1+V\_2+\ldots+V\_N\_V$.

23. The apparatus of claim 14, wherein said induction techniques comprise:
means for using any of induction techniques which include Bayes Net Learning, and CART (Classification and Regression Trees).

24. The apparatus of claim 14, wherein said induction techniques comprise:
means for developing any of decision rules and strategies to express accurately how to assign at least one action to each case, based on its decision keys.

25. The apparatus of claim 14, wherein said induction techniques comprise:
means for finding a rule R defined over a target population, such that $R(c\_i)$ accurately predicts a value $x*\_i$ for cases $c\_i$ in a representative population C; and
means for generating a strategy table to help develop said rule R.

26. The apparatus of claim 25, wherein said rule R uses decision keys of $c\_i$ to either of compute or predict at least one assigned action.

27. The apparatus of claim 25, wherein a most accurate decision rule is a rule for which $r(c\_i)$ is the same as $x*\_i$, for each $c\_i$ in C.

28. A method for implementation by one or more data processors comprising:
using, by at least one data processor, nonlinear optimization techniques to assign at least one action to each case in a representative population, the actions being constructed by:
notating, by at least one data processor, a set of feasible actions for each case as $A\_i$; wherein $A\_i$ is a function of case-level constraints,
for each case $c\_1$ instantiating, by at least one data processor, said decision keys E according to that case,
for each case-level constraint $K\_j$ computing, by at least one data processor, a set $A\_ij$ of feasible decisions,
setting, by at least one data processor, $A\_i$ to be a set of all actions in A that are feasible for all constraints, such that, $A\_i$ is the intersection of the sets $A\_ij$,
computing, by at least one data processor, a set $A\_ij$ of feasible decisions by selecting a method appropriate to a type of case-level constraint, wherein:
for constraints of type "If $q\_j(E)$, then x in $S\_j$" computing a logical predicate $q\_j(E)$;
if $q\_j(E)$ is true, then setting $A\_ij$ to $S\_j$;
if $q\_j(E)$ is false, then setting $A\_ij$ to A; wherein all possible actions are feasible; for constraints of "$h\_j$ $(E, x)<d\_j$" setting $A\_ij$ to an empty set for each alternative action a in A computing a value of $h\_j$ $(E, a)$;
if $h\_j(E, a)<d\_j$, then adding a to $A\_ij$; and
providing, by at least one data processor, a strategy table containing all cases in said representative population, along with at least one assigned action for each case.

29. An apparatus comprising:
means for using nonlinear optimization techniques to assign at least one action to each case in a representative population, the actions being constructed by:
notating a set of feasible actions for each case as $A\_i$; wherein $A\_i$ is a function of case-level constraints,
for each case $c\_1$ instantiating, by at least one data processor, said decision keys E according to that case,
for each case-level constraint $K\_j$ computing, by at least one data processor, a set $A\_ij$ of feasible decisions,
setting $A\_i$ to be a set of all actions in A that are feasible for all constraints, such that, $A\_i$ is the intersection of the sets $A\_ij$,
computing a set $A\_ij$ of feasible decisions by selecting a method appropriate to a type of case-level constraint, wherein:
for constraints of type "If $q\_j(E)$, then x in $S\_j$" computing a logical predicate $q\_j(E)$;

if q_j(E) is true, then setting A_ij to S_j;
if q_j(E) is false, then setting A_ij to A; wherein all possible actions are feasible; for constraints of "h_j (E, x)<d_j" setting A_ij to an empty set for each alternative action a in A computing a value of h_j (E, a);
if h_j(E, a)<d_j, then adding a to A_ij; and
means for providing a strategy table containing all cases in said representative population, along with at least one assigned action for each case.

30. A method for using strategy optimization, the method being implemented by one or more data processors and comprising:
creating, by at least one data processor, a strategy optimization influence diagram and a representative population to model a decision situation mathematically, the influence diagram graphically representing a decision model, with nodes or shapes representing variables in the decision model, and arcs or arrows between nodes representing relationships between variables;
formatting, by at least one data processor, said strategy optimization influence diagram as a nonlinear optimization problem over a representative population;
using, by at least one data processor, nonlinear optimization techniques to assign at least one action to each case in a representative population;
creating, by at least one data processor, a strategy table containing all cases in said representative population, along with at least one assigned action for each case;
applying, by at least one data processor, induction techniques to said strategy table to derive a set of rules from data; and
operationalizing, by at least one data processor, a set of rules derived by induction through a decision engine;
wherein said formatting said strategy optimization influence diagram as a nonlinear optimization problem over a representative population formulates a nonlinear optimization problem that substantially corresponds to a decision model specified in a modeling language;
wherein an optimal solution to said decision model can optionally be determined by using integer programming;
wherein a decision model is used an input to said strategy optimization influence diagram;
wherein said formulating a given decision model as a nonlinear optimization problem further comprises:
specifying, by at least one data processor, cases in said representative population;
constructing, by at least one data processor, feasible actions for a decision for each case; and
specifying, by at least one data processor, an objective function of said optimization,
wherein said specifying an objective function of the optimization comprises:
notating, by at least one data processor, said objective function by F(C,X,W):
selecting, by at least one data processor, a functional form for F(C,X,W), including any of:
a sum of some function f(c, x(c)) over all cases in C, or Sum_(c in C) {w(c)*f(c, x(c))}
a mean of some function f(c, x(c)) over all cases in C, or a ratio of Sum_(c in C) {w(c)*f(c, x(c))} to Sum_(c in C) {w(c)}
a mean or sum of some function f(c, x(c)) over a subset of cases in C; and
a sum of some function f2(c, x(c), m) over all cases in C for all possible instantiations m of portfolio variables in U, or Sum_(c in C, m in M) {P(U=m)* w(c)*f(c, x(c), m)}.

31. A method for using strategy optimization, the method being implemented by one or more data processors and comprising:
creating, by at least one data processor, a strategy optimization influence diagram and a representative population to model a decision situation mathematically, the influence diagram graphically representing a decision model, with nodes or shapes representing variables in the decision model, and arcs or arrows between nodes representing relationships between variables;
formatting, by at least one data processor, said strategy optimization influence diagram as a nonlinear optimization problem over a representative population;
using, by at least one data processor, nonlinear optimization techniques to assign at least one action to each case in a representative population;
creating, by at least one data processor, a strategy table containing all cases in said representative population, along with at least one assigned action for each case;
applying, by at least one data processor, induction techniques to said strategy table to derive a set of rules from data; and operationalizing, by at least one data processor, a set of rules derived by induction through a decision engine;
wherein said formatting said strategy optimization influence diagram as a nonlinear optimization problem over a representative population formulates a nonlinear optimization problem that substantially corresponds to a decision model specified in a modeling language;
wherein an optimal solution to said decision model can optionally be determined by using integer programming;
wherein a decision model is used an input to said strategy optimization influence diagram;
wherein said formulating a given decision model as a nonlinear optimization problem further comprises:
specifying, by at least one data processor, cases in said representative population;
constructing, by at least one data processor, feasible actions for a decision for each case; and
specifying, by at least one data processor, an objective function of said optimization,
wherein said specifying an objective function of the optimization comprises:
computing, by at least one data processor, a component function f(c, x(c)), which is a sum of a value of value variables, evaluated at each case, for each case c by:
setting, by at least one data processor, said decision keys in said decision model according to c;
then setting, by at least one data processor, a decision according to x(c);
then evaluating, by at least one data processor, all variables in a network; and
then evaluating, by at least one data processor, a sum V_1+V_2+...+V_N_V.

32. The method of claim 31, wherein a resulting nonlinear optimization problem is stated as:
selecting, by at least one data processor, values for all variables x_i in X to maximize F(C,X,W);
subject to the constraints:
x_i is in A_i (for all i in 1 to N_C); and
G_j(C,X,W)<=b_j (for all j in 1 to N_T); and once formulated as a nonlinear optimization problem, optionally optimizing, by at least one data processor, said decision model by using integer programming:

wherein a strategy table is output with a row for each case $c_i$ in a representative population C, one column for each decision key of case $c_i$, and a column for an optimal action $x^*_i$ assigned to case $c_i$.

* * * * *